(12) United States Patent
Robinson (10) Patent No.: US 12,365,225 B2
(45) Date of Patent: Jul. 22, 2025

(54) OUTER BELT WITH MOLDED SNAP-FIT RETENTION FEATURE

(71) Applicant: COOPER-STANDARD AUTOMOTIVE, INC., Northville, MI (US)

(72) Inventor: Aaron Robinson, Ortonville, MI (US)

(73) Assignee: Cooper-Standard Automotive, Inc., Northville, MI (US)

( * ) Notice: Subject to any disclaimer, the term of this patent is extended or adjusted under 35 U.S.C. 154(b) by 0 days.

(21) Appl. No.: 18/370,960

(22) Filed: Sep. 21, 2023

(65) Prior Publication Data

US 2024/0100925 A1 Mar. 28, 2024

Related U.S. Application Data

(60) Provisional application No. 63/409,751, filed on Sep. 24, 2022.

(51) Int. Cl.
*B60J 10/30* (2016.01)
*B60J 10/75* (2016.01)

(52) U.S. Cl.
CPC ............. *B60J 10/75* (2016.02); *B60J 10/30* (2016.02)

(58) Field of Classification Search
CPC ............ B60J 10/36; B60J 10/75; B60J 10/30
See application file for complete search history.

(56) References Cited

U.S. PATENT DOCUMENTS

| | | | |
|---|---|---|---|
| 4,949,507 A | 8/1990 | Vaughan | |
| 5,207,027 A | 5/1993 | Larsen | |
| 5,493,815 A | 2/1996 | Belser et al. | |
| 5,618,593 A | 4/1997 | Belser et al. | |
| 5,799,442 A * | 9/1998 | Takahashi | B60J 10/75 49/492.1 |
| 6,128,859 A * | 10/2000 | Vance | B60J 10/265 49/440 |
| 6,598,348 B2 * | 7/2003 | Palicki | B60J 10/30 49/492.1 |
| 8,479,449 B2 * | 7/2013 | Titz | B60J 10/78 49/440 |
| 8,549,790 B2 * | 10/2013 | Murree | B60J 10/75 49/377 |
| 10,293,670 B2 * | 5/2019 | Makita | B60J 10/33 |

(Continued)

FOREIGN PATENT DOCUMENTS

WO WO2009/143250 A1 11/2009

*Primary Examiner* — Daniel J Troy
*Assistant Examiner* — Susan M. Heschel
(74) *Attorney, Agent, or Firm* — Lippes Mathias LLP (57) ABSTRACT

A belt seal assembly is provided for an associated vehicle. The belt seal assembly includes a first leg and a second leg interconnected at one end by a base to form an inverted, generally U-shaped body. A seal lip extends outwardly from an outer face of the first leg that is configured to slidably, sealingly engage an associated window surface of the associated vehicle. A tab extends from the body and is dimensioned to be received in snap-fit relation with an associated opening of an associated outer door panel. The tab includes a hard retaining insert received in a more flexible overmold that forms an end cap. A protrusion extending from the retaining insert snap-fits with an opening in the associated vehicle door panel. The belt seal assembly can also be removed from the vehicle for servicing.

10 Claims, 7 Drawing Sheets

(56) References Cited

U.S. PATENT DOCUMENTS

| | | | |
|---|---|---|---|
| 10,336,170 B2* | 7/2019 | Kim | B60J 10/75 |
| 10,946,735 B2 | 3/2021 | Robinson | |
| 11,110,783 B2* | 9/2021 | Sävström | B60J 10/75 |
| 2005/0235569 A1 | 10/2005 | Shumulinskiy | |

* cited by examiner

OUTER BELT WITH MOLDED SNAP-FIT RETENTION FEATURE

This application claims the priority benefit of provisional U.S. application Ser. No. 63/409,751, filed Sep. 24, 2022, the entire disclosure of which is expressly incorporated herein by reference.

BACKGROUND

The present disclosure relates to a seal assembly that is also referred to in the automotive industry as a weatherstrip, weatherseal, or seal assembly, and more particularly a weatherseal assembly used in connection with a vehicle. The weatherseal assembly of the present disclosure specifically relates to what is known as a vehicle belt assembly that is provided along a lower edge of a window opening formed in a door of the vehicle, and more specifically an outer belt assembly.

Belt seal assemblies are generally known in the art. For example, commonly owned patents and published applications U.S. Pat. No. 10,946,735 (Exhibit A); U.S. Pat. Nos. 4,949,507; 5,207,027; 5,493,815; 5,618,593; US 2005/0235569A1; and WO2009/143250A1 are representative of other belt seal assemblies, and the entire disclosure of each is expressly incorporated herein by reference.

A need exists for an improved outer belt weatherseal assembly that is cost effective, that is easy to manufacture, conducive to assembly on a vehicle door, improves retention of the outer belt, and that includes a feature allowing the assembly to be easily removed for service.

SUMMARY

The present invention discloses an outer belt assembly that includes an end mold with a snap-fit insert retention feature to advantageously secure the outer belt assembly to an associated vehicle door, and that is also configured for ease of serviceability.

In one embodiment, the configured retention feature includes a positive locating feature for receiving and aligning an associated removal tool to disengage the insert retention feature from engagement with the associated vehicle door.

The configured retention feature in one embodiment may include a v-shaped groove to receive and guide the associated removal tool and disengage the retention feature, and in another variation, the configured retention feature includes an opposing tab that is adapted to be engaged by the associated removal tool for serviceability of the outer belt assembly.

This disclosure eliminates the need to package a screw or dictate original equipment manufacturer (OEM) installation procedure.

The present disclosure allows the outer belt assembly to be slid into place and an integrated retention feature advances into an engaged position to advantageously secure the outer belt assembly to an associated vehicle door along a belt line of an associated opening in the vehicle door.

The outer belt assembly cannot be removed without deactuating the retention feature, such as a protrusion, from locking engagement with the associated vehicle door.

The assembly can also be easily serviced without breaking the retention feature.

Other than for servicing, the outer belt assembly of the present disclosure includes a fully integrated retention feature, shoulder, or clip that requires no tools and no auxiliary fasteners to secure the outer belt assembly in place.

The present disclosure can be advantageously used for so-called frameless vehicles, and can also be used in connection with a frame-under-glass vehicle construction.

The outer belt assembly may be installed with the window (glass) in place or without the window in place, while prior art arrangements usually require the window to be in place when mounting the outer belt assembly.

Still other benefits and advantages of the present disclosure will become more apparent from reviewing and understanding the following detailed description and drawings.

DETAILED DESCRIPTION

Figure 1:
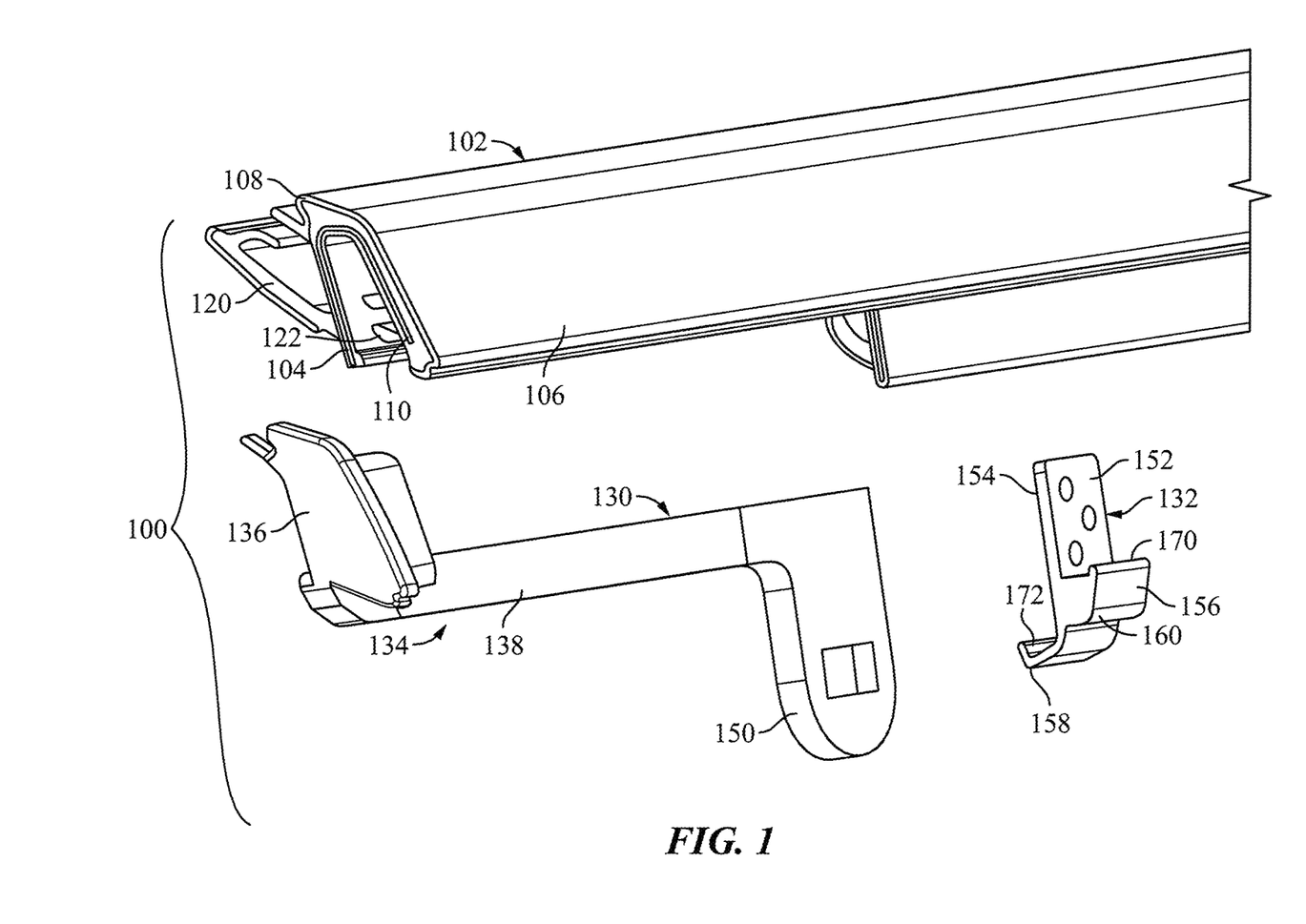
FIG. 1 is an exploded perspective view of one end of a weatherseal assembly (outer belt assembly) of the present disclosure.
Figure 2:
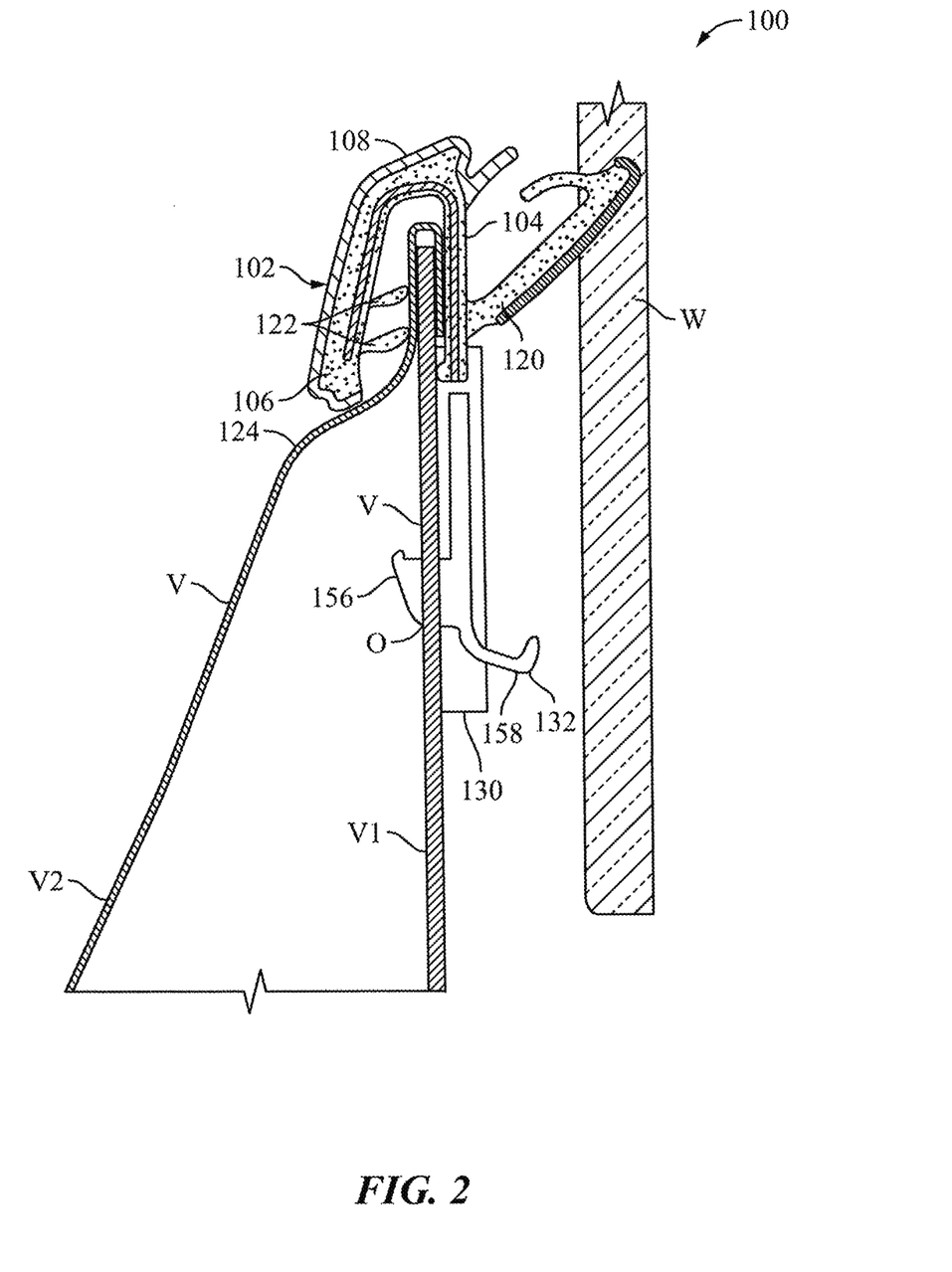
FIG. 2 is an enlarged, cross-sectional view of the outer belt assembly of FIG. 1 mounted to an associated vehicle along a belt line of a window opening in a door of the associated vehicle.
Figure 3:
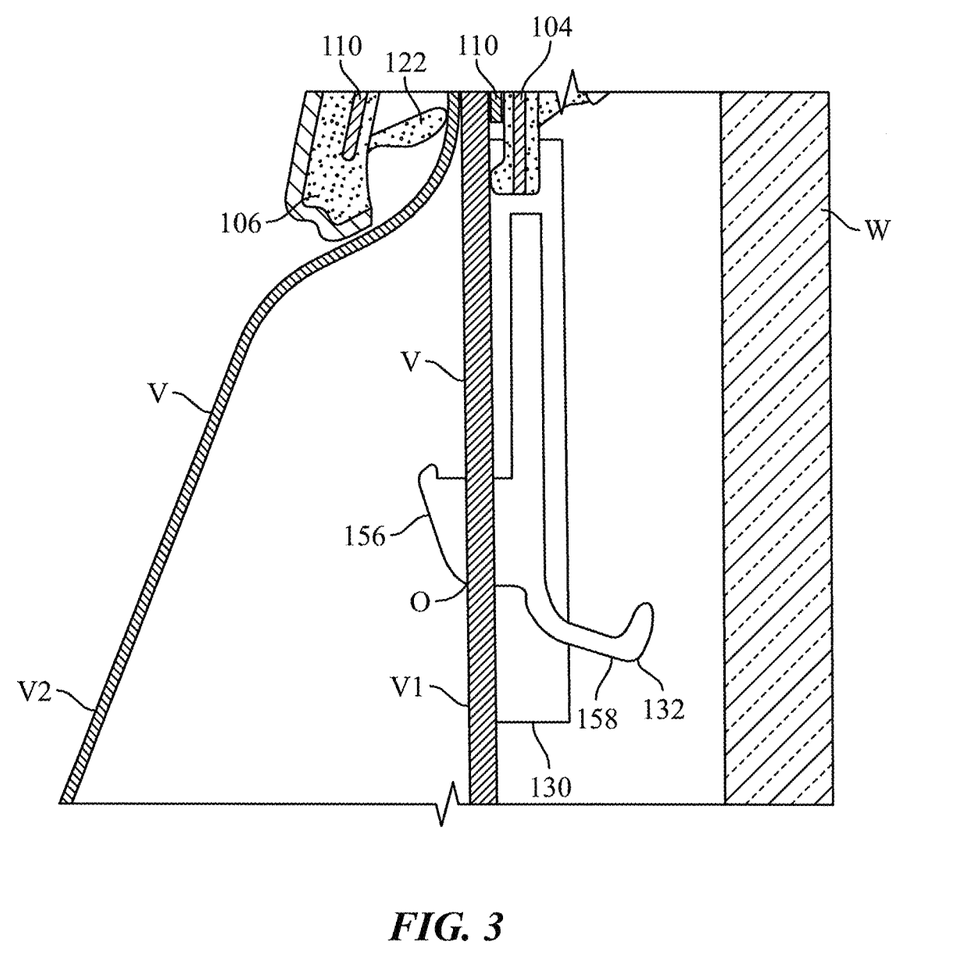
FIG. 3 is a further enlarged view of portions of FIG. 2 with the encircled broken lines portion of the outer belt assembly particularly showing the retention feature that secures the outer belt assembly to the associated vehicle door, and the protruding service feature or tab that facilitates removal of the outer belt assembly from the associated door.

FIGS. 1-3 illustrate the present invention of a weatherseal assembly 100, particularly an outer belt assembly, in an exploded, unmounted view of FIG. 1 and assembled to an associated vehicle door V that includes a first or inner door panel V1 and a second or outer door panel V2 that are joined together along a vehicle door flange VDF as shown in FIGS. 2 and 3. The outer belt assembly 100 includes an extrusion portion or body 102 having a generally inverted U-shaped configuration formed by a first or inner leg 104 connected to a second or outer leg 106 by an interconnecting base 108. The extrusion portion or body 102 of the illustrated embodiment typically includes a carrier or core 110 (e.g., metal, wire, and/or plastic) that is preferably at least partially encapsulated by an extruded material such as EPDM, TPV, and/or TPE, although this list of preferred extrusion materials should not be deemed limiting.

With continued reference to FIG. 1, and additional reference to FIGS. 2-3, at least a first sealing lip 120 extends outwardly from the extruded body 102 (i.e., outwardly from an outer surface of the first leg 104 and in a direction away from the second leg 106) toward the window (glass) W. The first sealing lip 120 may include a flock, or a low friction material or coating that reduces friction between the at least first sealing lip and a surface of the window W during relative movement between the sealing lip(s) and the window when the window is raised and lowered. Further, at least one gripping member 122, and preferably first and second gripping members 122*a*, 122*b* extend from the second leg 106 of the body 102 in a direction toward the first leg 104. The at least first sealing lip 120 and the gripping members 122 preferably extend along the length of the body in order to seal against the window W and secure the outer belt assembly 100 along the length of the vehicle door flange VDF, respectively.

There is shown in FIG. 2 a portion of the associated vehicle door (door) V with a window opening. As is well known, the window (glass) W moves upwardly and downwardly in the door V to selectively close the window opening in an upper, raised position, and provide an opening in the door in a lowered position. The door outer panel V2 has a conformation that forms a recess 124 that extends laterally inwardly toward the flange, and the recess receives a show portion (outer surface of the second leg 106 of the body 102 of the outer belt assembly (extrusion) 100 as illustrated in FIG. 3 when the extrusion is mounted on the vehicle door V.

A retention feature is also shown in FIG. 1 and includes an overmold 130 and a retaining insert 132. The overmold 130 is a portion of and configured to serve as an end cap 134 of the assembly that is received in an end of the extrusion. Preferably the overmold 130/end cap 134 has a planar end face 136 that is contoured to cover a terminal end of the U-shaped extrusion 102. Extending axially from the planar end face 136 of the overmold 130 is a longitudinal portion 138 that has a downturned finger or tab 150 at an opposite end of the overmold from the planar end face. The downturned tab 150 receives the insert or retaining insert 132 (preferably the overmold 130 is formed (overmolded) over at least part of the retaining insert). The retaining insert 132 preferably has a limited longitudinal or axial length (a slightly narrower longitudinal width than a longitudinal width of the tab 150) and the retaining insert in one arrangement preferably has generally planar opposite faces 152, 154. First and second protrusions 156, 158 extend outwardly from the opposite, planar faces of the insert. The first or upper protrusion 156 has a curved outer contour 160 that facilitates snap-fit receipt of the upper protrusion through an associated slot or opening O in the vehicle door (e.g., in the inner panel V1 of the vehicle door V—FIGS. 2 and 3) when the outer belt assembly 100 is mounted over the door flange VDF. The slot/opening O provided in the door flange V1 is preferably adjacent at least one longitudinal end near a vehicle pillar (e.g., B pillar) so that the slot/opening receives the first or upper protrusion 156 (illustrated as extending outwardly from the planar surface 152 (left-hand surface of the retaining insert 132 and the overmold 130 that encases the retaining insert and preferably spaced along a longitudinal extent of the flange) at a transition region between the tip and the remainder of the flange.

An upturned lip or shoulder 170 at the upper, outer edge of the upper protrusion 156 prevents inadvertent removal of the upper protrusion from the vehicle door slot/opening O once the upper protrusion has been received therein. The second or lower protrusion 158 preferably extends from the opposite face 154 of the retaining insert 132. The lower protrusion 158 also includes an upturned lip or shoulder 172 at a terminal end, and the upturned lip/shoulder of the retaining insert 132 is spaced from the surface of the overmold 130 by a limited dimension that is adapted to receive a flat or planar tool surface such as a screwdriver, putty knife, or spatula therein, for servicing, i.e., removal, of the outer belt assembly 100 from the vehicle door V if required for servicing such as repair or replacement. To achieve this, a trim panel (not shown) would be removed from the door V, a downward force exerted on the outer belt assembly 100, and then the lower tab 158 engaged by a flat screwdriver/spatula or similar tool to separate the outer belt assembly from the flange opening O (i.e., the tool would engage the shoulder 172 of the lower protrusion 158, and the shoulder 170 of the upper protrusion 156 removed from the opening O in the inner door panel V1).

The cross-sectional views of FIGS. 2-3 are taken along the belt assembly 100. These figures exhibit a structural profile of the body 102 of the outer belt seal assembly 100 that can be easily extruded/coextruded for ease of manufacture and the integrated overmold 130/retaining insert 132/end cap 134 is then inserted into a terminal end of the extruded/coextruded body 102. The weatherseal assembly 100 is preferably extruded from an elastomeric material that includes, for example, commonly used weatherstrip materials such as EPDM (ethylene propylene diene monomer rubber), TPE (thermoplastic elastomer), and/or TPV (thermoplastic vulcanizate) material, although this list of preferred materials should likewise not be deemed limiting since it is understood that other materials or combinations of materials can also be used. As noted above, at least a portion of the weatherseal assembly 100 is oftentimes reinforced with a carrier or core 110, for example, with a steel, aluminum (or possibly a hard plastic core), and/or a wire carrier that is completely or partially encapsulated through the co-extruded manufacturing process. Again, this structural and manufacturing preference should not be construed as the only way to assemble or manufacture the weatherseal assembly 100. The overmold 130 and the retaining insert 132 are preferably a molded plastic construction. In a preferred arrangement, the overmold 130/end cap 134 is a TPV, while the retaining insert 132 is a harder, less flexible, plastic material such as a glass filled nylon. Again, the preferred materials of the end cap 134/overmold 130 and retaining insert 132 should not be deemed limiting since it is understood that other materials or combinations of materials can also be used without departing from the scope and intent of the present disclosure.

FIGS. 4-10 illustrate another embodiment, that includes modifications from that version of the present disclosure described in connection with FIGS. 1-3. For ease of illustration and understanding, and for purposes of brevity, like reference numerals in the "200" series will be used to refer to like components in the embodiment of FIGS. 4-10 that were previously described in connection with FIGS. 1-3. For example, the weatherseal/outer belt assembly in FIGS. 4-10 will be generally identified by reference numeral 200 while the weatherseal/outer belt assembly of FIGS. 1-3 used reference numeral 100. Where possible, new reference numerals will be used to identify new components.

Body 202 exhibits the same structural features and functions as the body 102 associated with the previous embodiment. The body 202 includes a first or inner leg 204 joined to a second or outer leg 206 by an interconnecting base 208. The body 202 may include a carrier or core 210, and includes one or more sealing lips 220 that extend outwardly for engagement with a window W, and one or more gripping members 222 that grippingly engage an associated vehicle door flange VDF to mount the body to the associated vehicle door V.

Figure 4:
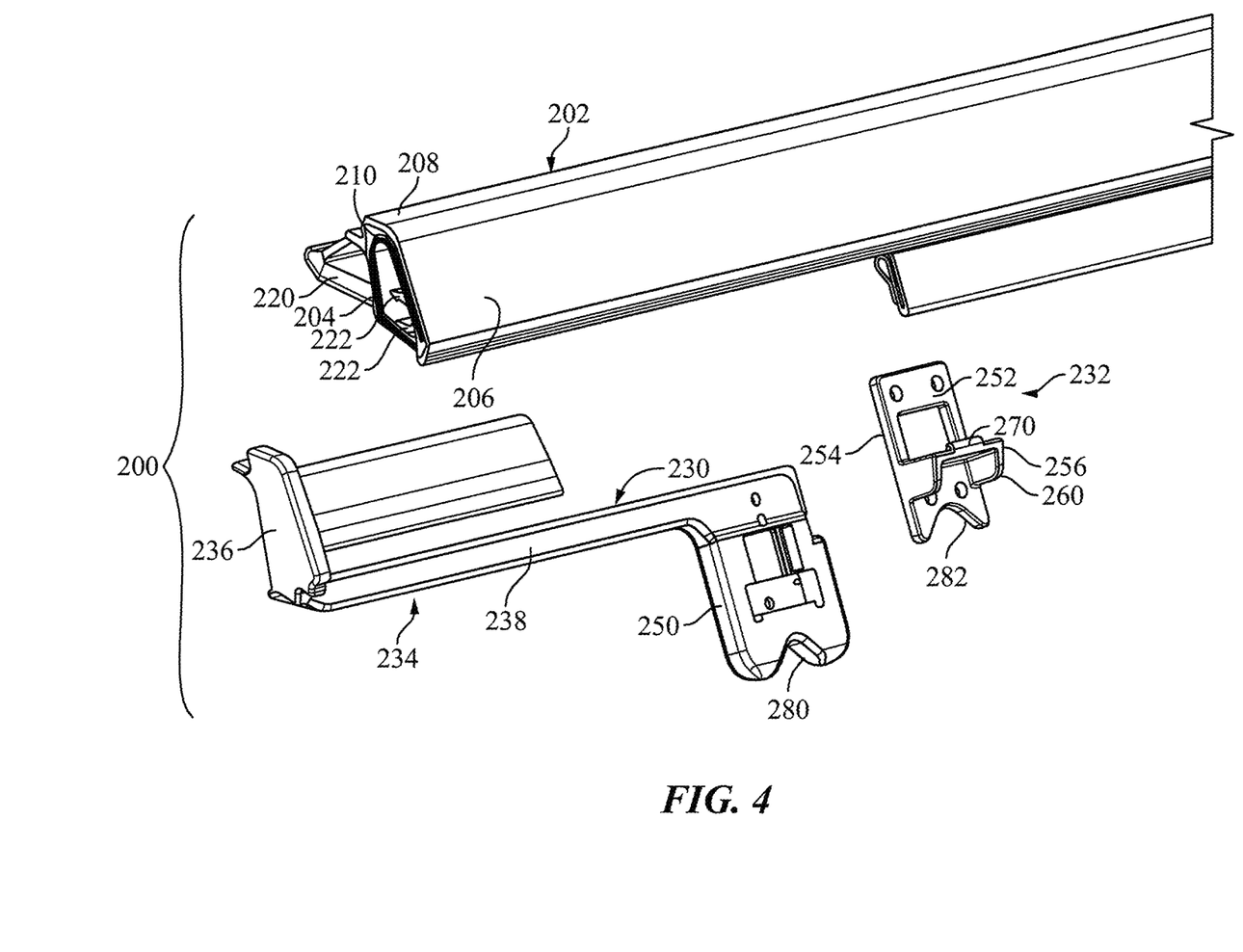
FIG. 4 is an exploded perspective view of a modified version of the weatherseal assembly of FIGS. 1-3.
Figure 5:
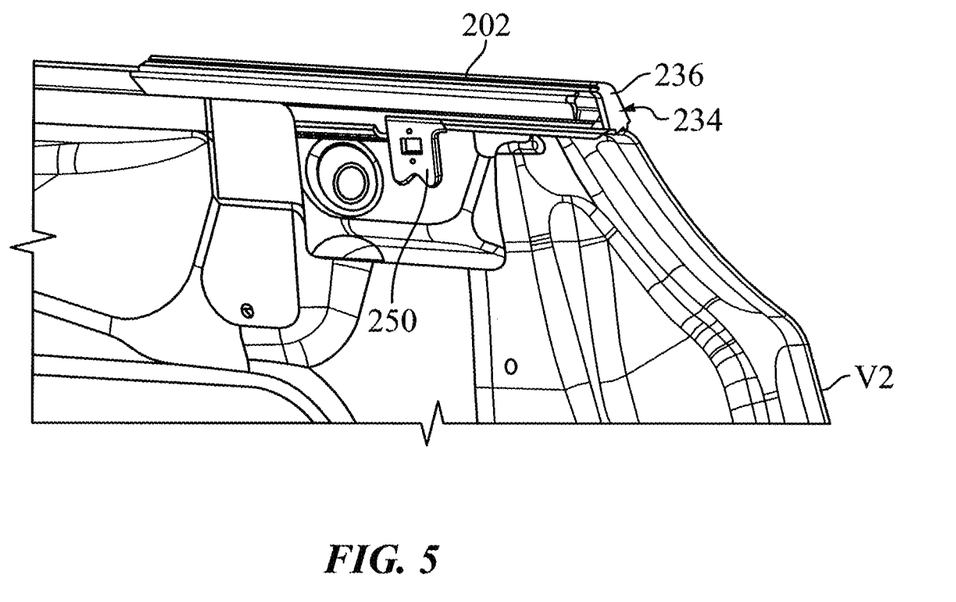
FIG. 5 is a perspective view of the outer belt seal assembly mounted on the associated vehicle door and viewed from inside the door.
Figure 6:
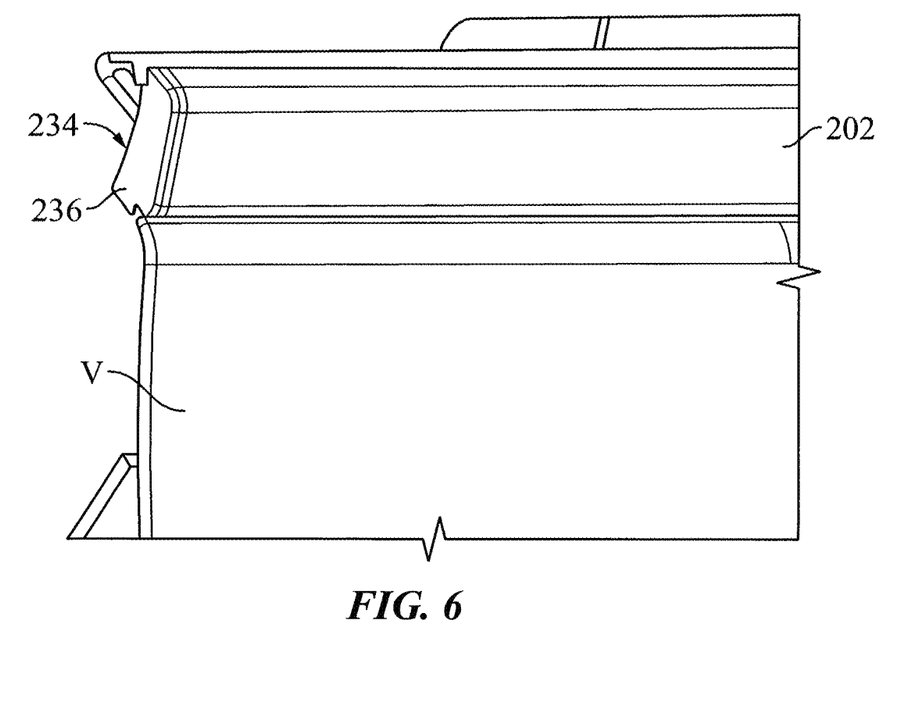
FIG. 6 is a perspective view of the modified weatherseal assembly of FIG. 4 viewed from outside the associated vehicle door.
Figure 7:
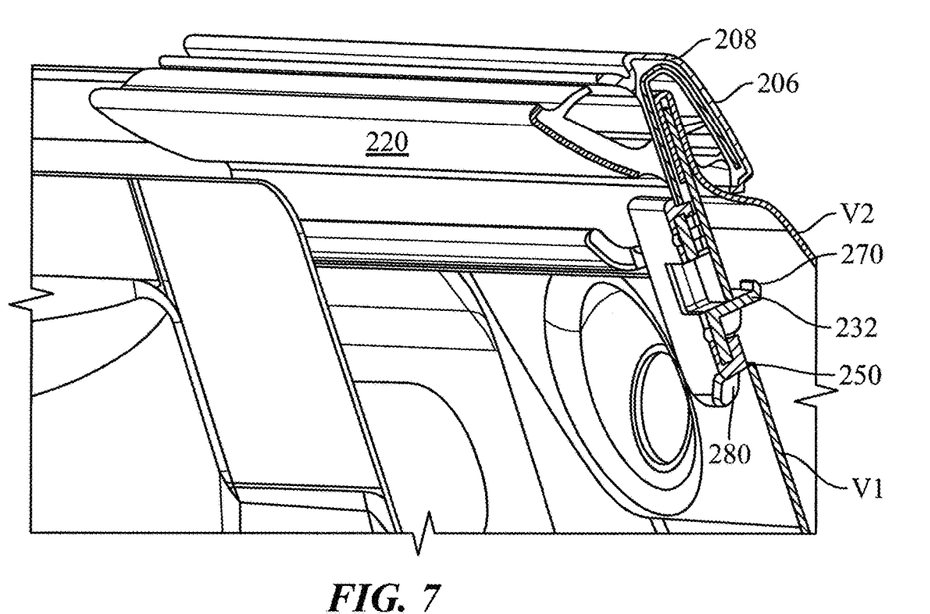
FIG. 7 is an enlarged cut-away or sectional perspective view of the modified weatherseal assembly viewed from inside the associated vehicle door and with the window removed for ease of illustration.
Figure 8:
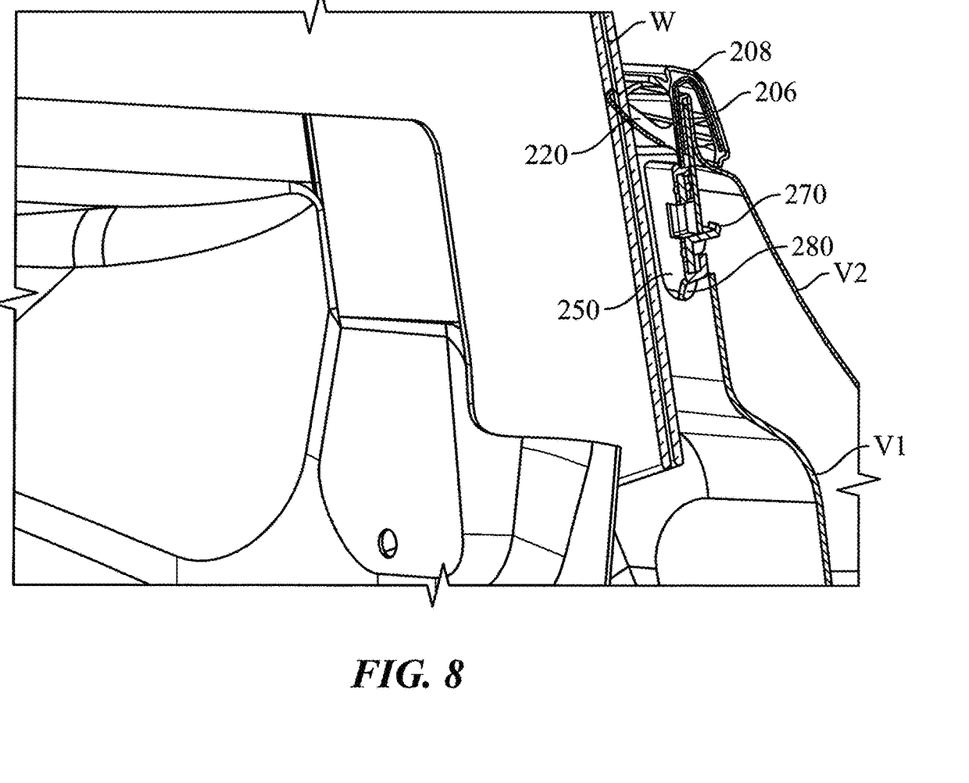
FIG. 8 is a view similar to FIG. 7 with the window included therein.
Figure 9:
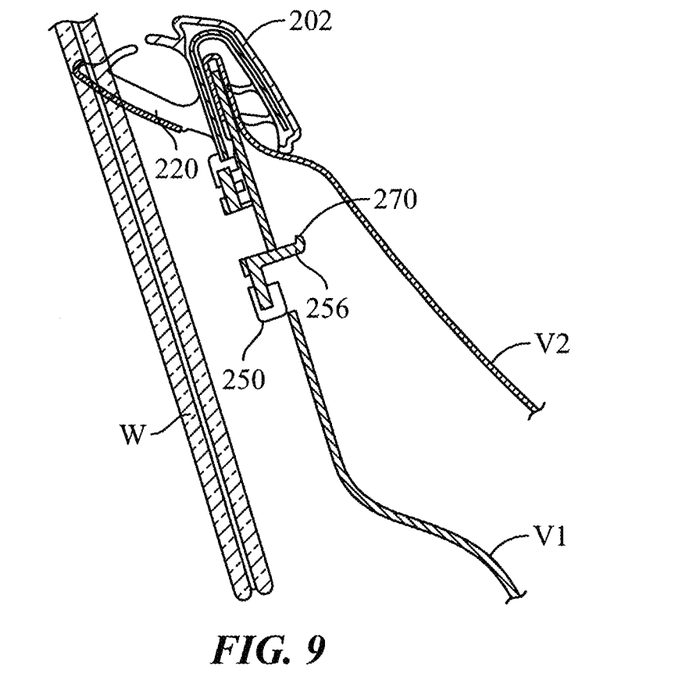
FIG. 9 is a cross-sectional view of the modified weatherseal assembly.
Figure 10:
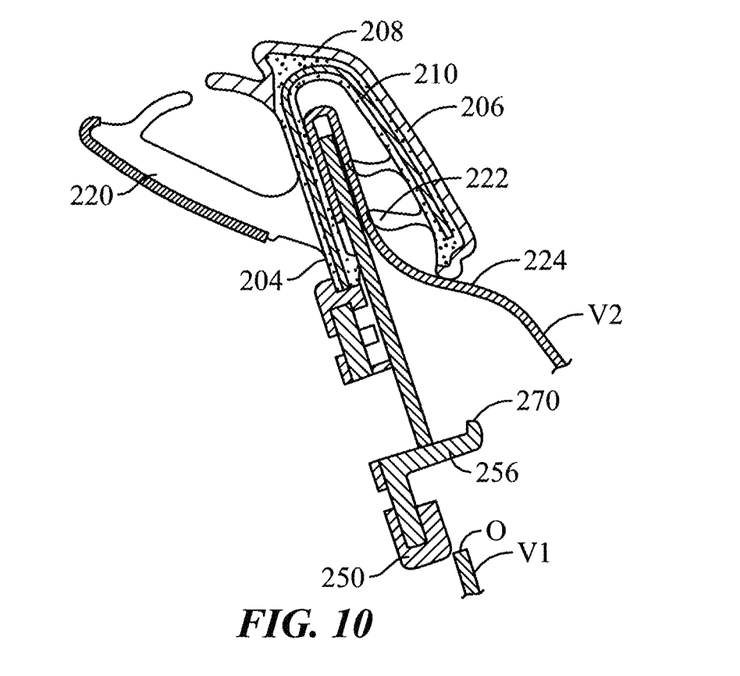
FIG. 10 is an enlarged view of portions of FIG. 9.

More particularly, weatherseal/outer belt assembly 200 in FIG. 4 is believed to be an improvement over the assembly 100 of FIGS. 1-3 for at least the following noted differences. For example, overmold 230 is still incorporated into an end cap 234. The end cap 234 includes a substantially planar face 236 that abuts against the end of the body 202. On a front door, the end cap 234 is received at the B pillar (typically the outer belt assembly is secured via a fastener (e.g., screw) at the A pillar). On a rear door, end caps 234 such as described herein can be used at one or both ends (B and C pillars) of the outer belt assembly 200 to close out terminal ends of the body 202, and to secure the outer belt assembly 200 to the vehicle door V.

Tab 250 incorporates a locating feature 280 to positively guide an associated tool (not shown). A preferred configuration of the locating feature 280 is a V-shaped recess along a bottom surface of the tab 250. As will be appreciated, a tool such as a J-shaped fishhook may be advanced past seal lip 220 so that the J-shaped fishhook end is received in the V-shaped recess 280. By pulling upwardly and rocking the tool, the tab 250 and particularly retaining insert 232 can be removed from the opening O in the inner door panel V1 to facilitate extraction of shoulder 270 from the door panel opening. As evident from a comparison of FIGS. 1 and 4, the retaining insert 232 includes only one protrusion, namely protrusion 256 extending outwardly from face 252 of the retaining insert. Because of the locating feature 280, there is no need for a second protrusion in this modified embodiment as described in the embodiment of FIGS. 1-3. The retaining insert 232 is similarly configured with a V-shaped recess 282 that conforms to the shape and location of locating feature 280 of the tab 250.

In addition, the protrusion 256 (FIG. 4) is formed as a pair of gussets rather than a solid block as used in the embodiment of FIGS. 1-3. Curved surfaces 260 on the gussets facilitate guidance of the protrusion 256 into the opening O in inner door panel V1. Likewise, the curved surfaces 260 also prevent breaking of the protrusion 256 during the extraction process.

As is the case in the prior embodiment, the arrangement of FIG. 4 preferably forms the end cap 234/overmold 230 of a more flexible material (e.g., TPV) than the harder, less flexible glass filled nylon preferably used in the construction of the retaining insert 232.

Installation of the outer belt assembly 100, 200 also provides a feedback to the installer when the hard retaining insert shoulder 270 snaps into place in the vehicle door panel opening O. The more flexible material used in the end cap 234 allows that end of the outer belt assembly 202 to flex during installation. Once installed, there is no requirement of an additional pushpin, rivet, secondary fastener, adhesive, tape, etc. used to secure the end of the outer belt assembly 200 in place.

By removing the second protrusion in the embodiment of FIGS. 4-10, there is less chance for potential scratching of the window W since there is no protrusion from the side of the tab 250 and retaining insert 232 that face the window.

To facilitate manufacture of the tab 250 and the retaining insert 232, central openings 290, 292, respectively, are provided therein and align with one another when the overmold material of the end cap is molded over the retaining insert. The openings 290, 292 facilitate manufacture of the molded arrangement by allowing tool components to slide or pass therethrough.

The concepts of the present disclosure are shown relative to an outer belt seal assembly, but may also find application in connection with the inner belt seal assembly without departing from the scope and intent of the present disclosure.

This written description uses examples to describe the disclosure, including the best mode, and also to enable any person skilled in the art to make and use the disclosure. The patentable scope of the disclosure may include other examples that occur to those skilled in the art. Such other examples are intended to be within the scope of the present invention if they have structural elements that do not differ from the literal language hereof, or if they include equivalent structural elements with insubstantial differences from the literal language of this disclosure. Moreover, this disclosure is intended to seek protection for a combination of components and/or steps.

| Component List | |
|---|---|
| V | vehicle door |
| V1 | inner door panel |
| V2 | outer door panel |
| VDF | vehicle door flange |
| W | window |
| O | opening in inner door panel |
| 100/200 | weatherseal/outer belt assembly |
| 102/202 | body |
| 104/204 | first/inner leg |
| 106/206 | second/outer leg |
| 108/208 | base |
| 110/210 | carrier/core |
| 120/220 | sealing lip |
| 122/222 | gripping member |
| 124/224 | recess |
| 130/230 | overmold |
| 132/232 | retaining insert |
| 134/234 | end cap |
| 136/236 | end face |
| 138/238 | longitudinal portion |
| 150/250 | tab/finger |
| 152/252 | retaining insert planar face |
| 154/254 | retaining insert planar face |
| 156/256 | first protrusion |
| 158 | second protrusion |
| 160/260 | curved contour (first protrusion) |
| 170/270 | shoulder (received in door panel opening) |
| 172 | shoulder (to be engaged by tool) |
| 280 | locating feature |
| 282 | v-shaped recess |

It is claimed:

1. A belt seal assembly for an associated vehicle, the belt seal assembly including:
    a first leg and a second leg interconnected at one end by a base to form an inverted, generally U-shaped body;
    a seal lip extending outwardly from an outer face of the first leg that is configured to slidably, sealingly engage an associated window surface of the associated vehicle;
    a retention feature connected to the body and comprising a tab extending outwardly away from the body; and
    an insert connected to the tab and comprising a protrusion extending outwardly relative to said tab, said protrusion dimensioned to be received in snap-fit relation with an associated opening of an associated door panel;
    wherein said retention feature includes a locating recess adapted to positively guide an associated tool into engagement with said retention feature for extraction of said protrusion from the associated opening of the associated door panel; and
    wherein the locating recess comprises a V-shaped recess in a bottom surface of said retention feature.

2. The belt seal assembly of claim 1 wherein the protrusion of the insert has a first surface facing outwardly that has a rounded edge extending in a first direction to slide along the associated door panel, and a shoulder extending in a second direction opposite the first direction that is configured to be received in snap-fit relation with the associated opening of the associated door panel.

3. The belt seal assembly of claim 2 wherein the tab is molded from a first material and the retaining insert is molded from a second material that is harder and less flexible than the first material.

4. The belt seal assembly of claim 2 wherein the insert includes spaced gussets extending therefrom to strengthen the protrusion from deflection when inserted into the associated opening of the associated door panel.

5. The belt seal assembly of claim 1 wherein the V-shaped recess comprises a first V-shaped recess portion formed in the tab and a second V-shaped recess portion formed in the insert that is aligned with the first V-shaped recess portion of the tab.

6. A belt seal assembly for an associated vehicle, the belt seal assembly including:
a first leg and a second leg interconnected at one end by a base to form an inverted, generally U-shaped body;
a seal lip extending outwardly from an outer face of the first leg that is configured to slidably, sealingly engage an associated window surface of the associated vehicle;
a retention feature connected to the body and comprising a tab extending outwardly away from the body; and
an insert connected to the tab and comprising a protrusion extending outwardly relative to said tab, said protrusion dimensioned to be received in snap-fit relation with an associated opening of an associated door panel;
wherein said retention feature includes a locating recess adapted to positively guide an associated tool into engagement with said retention feature for extraction of said protrusion from the associated opening of the associated door panel; and
wherein:
the insert includes a central opening therethrough;
the tab includes a central opening therethrough; and
the central openings of the insert and tab are aligned.

7. The belt seal assembly of claim 6 wherein the tab and insert are provided as part of an end cap received in one end of the body, wherein said end cap comprises an end face and a longitudinal portion extending axially from the end face, wherein the tab extends from the longitudinal portion at an opposite end from said end face.

8. The belt seal assembly of claim 7 wherein the tab is made of a more flexible material than the retaining insert.

9. An outer belt assembly that is configured to be mounted to an associated vehicle door, the outer belt assembly comprising:
an elongated body having a show surface facing outwardly therefrom along one face thereof, and at least one seal facing in a direction opposite the show surface for selective sealing engagement with an associated window surface; and
a retention assembly that operatively engages the body adjacent at least one end of the body, the retention assembly including an end face, a longitudinal portion extending axially from the end face, a tab extending from the longitudinal portion at a location spaced from the end face, and an insert connected to the tab, said insert including a protrusion extending outwardly therefrom and configured to be received and releasably retained in an associated opening in the associated door;
a locating recess connected to said tab and adapted to receive an associated extraction tool for disengagement of the protrusion from the associated opening of the associated door;
wherein the locating recess includes a V-shaped recess located along a bottom surface of the tab and adapted to receive and guide the associated extraction tool to disengage the protrusion from the associated opening of the associated door.

10. An outer belt assembly that is configured to be mounted to an associated vehicle door, the outer belt assembly comprising:
an elongated body having a show surface facing outwardly therefrom along one face thereof, and at least one seal facing in a direction opposite the show surface for selective sealing engagement with an associated window surface; and
a retention assembly that operatively engages the body adjacent at least one end of the body, the retention assembly including an end face, a longitudinal portion extending axially from the end face, a tab extending from the longitudinal portion at a location spaced from the end face, and an insert connected to the tab, said insert including a protrusion extending outwardly therefrom and configured to be received and releasably retained in an associated opening in the associated door;
a locating recess connected to said tab and adapted to receive an associated extraction tool for disengagement of the protrusion from the associated opening of the associated door;
wherein the protrusion extends from a first face of the insert in a first direction and the insert further comprises a second protrusion extending from an opposite second face of the insert in a second direction opposite the first direction, wherein said locating recess is defined by an upturned lip at an outer end of said second protrusion.

* * * * *